(12) United States Patent
Dyckmans et al.

(10) Patent No.: US 12,194,705 B2
(45) Date of Patent: Jan. 14, 2025

(54) METHOD AND APPARATUS FOR CURING

(71) Applicant: adidas AG, Herzogenaurach (DE)

(72) Inventors: Christoph Dyckmans, Nuremberg (DE); Matthias Weisskopf, Ansbach (DE)

(73) Assignee: adidas AG, Herzogenaurach (DE)

( * ) Notice: Subject to any disclaimer, the term of this patent is extended or adjusted under 35 U.S.C. 154(b) by 531 days.

(21) Appl. No.: 17/419,601

(22) PCT Filed: Jan. 8, 2020

(86) PCT No.: PCT/EP2020/050266
§ 371 (c)(1),
(2) Date: Jun. 29, 2021

(87) PCT Pub. No.: WO2020/144206
PCT Pub. Date: Jul. 16, 2020

(65) Prior Publication Data
US 2022/0080690 A1 Mar. 17, 2022

(30) Foreign Application Priority Data
Jan. 8, 2019 (DE) .......................... 102019200130.0

(51) Int. Cl.
*B29D 35/12* (2010.01)
*B33Y 80/00* (2015.01)

(52) U.S. Cl.
CPC ............ *B29D 35/122* (2013.01); *B33Y 80/00* (2014.12)

(58) Field of Classification Search
CPC ...... B29D 35/122; B33Y 10/00; B33Y 30/00; B33Y 80/00
See application file for complete search history.

(56) References Cited

U.S. PATENT DOCUMENTS

| 5,851,563 A | * | 12/1998 | Hoffman ................. B28B 7/025 425/182 |
| 2014/0109440 A1 | | 4/2014 | McDowell et al. |
| 2014/0175703 A1 | | 6/2014 | Percival, Jr. |

FOREIGN PATENT DOCUMENTS

| BE | 1018819 A3 | 9/2011 |
| CN | 204725866 U | 10/2015 |
| CN | 205522454 U | 8/2016 |
| CN | 205951153 U | 2/2017 |

(Continued)

OTHER PUBLICATIONS

International Patent Application No. PCT/EP2020/050266, International Search Report and Written Opinion, mailed Mar. 12, 2020, 9 pages.

(Continued)

*Primary Examiner* — Jamel M Nelson
(74) *Attorney, Agent, or Firm* — Kilpatrick Townsend & Stockton LLP

(57) ABSTRACT

The invention concerns a method for treating an article produced at least partly by an additive manufacturing process, comprising: (a) providing a form, comprising a contacting portion configured to contact the article, wherein the contacting portion comprises at least a first surface and a second surface; (b) adjusting a length of the contacting portion and/or adjusting a height of the first surface relative to the second surface; (c) arranging the article on the form such as to contact the contacting portion; and (d) curing the article.

10 Claims, 11 Drawing Sheets

(56) References Cited

FOREIGN PATENT DOCUMENTS

Figure 1A:
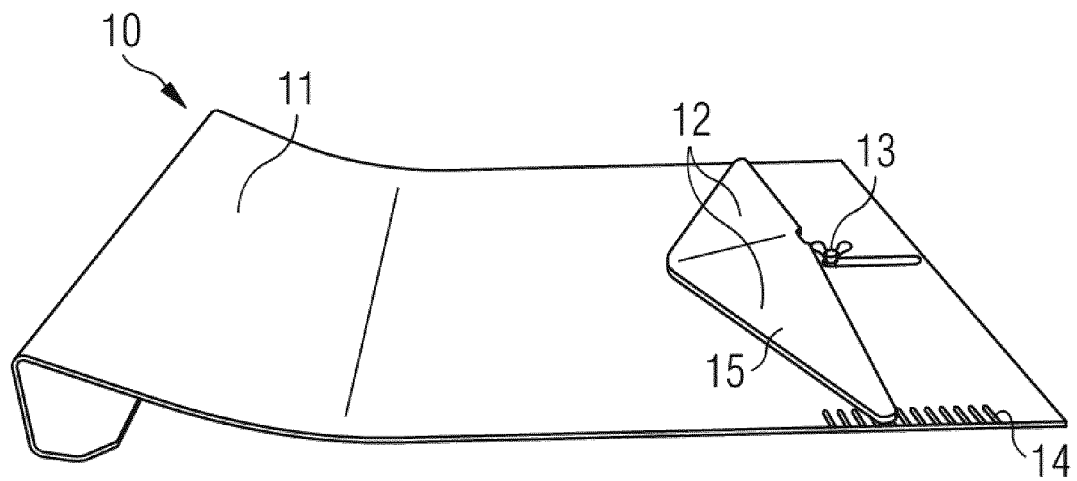

| DE | 102016124387 | 5/2018 |
|----|--------------|--------|
| FR | 2829721 | 3/2003 |
| GB | 1425312 | 2/1976 |
| GB | 2268699 | 1/1994 |
| WO | 2017180958 | 10/2017 |

OTHER PUBLICATIONS

Office Action, Chinese Application No. 202080008258.X, Sep. 8, 2022, 19 pages.
Office Action, European Patent Application No. 20700439.1, Jul. 15, 2022, 4 pages.
Office Action, German Patent Application No. 10 2019 200 130.0, May 5, 2022, 10 pages.
Office Action, Chinese Patent Application No. 202080008258.X, Mar. 29, 2023, 19 pages.
Office Action, European Patent Application No. 20700439.1, Apr. 12, 2023, 4 pages.

\* cited by examiner

METHOD AND APPARATUS FOR CURING

CROSS-REFERENCE TO RELATED APPLICATIONS

This application is a national stage application of International Patent Application PCT/EP2020/050266, filed on Jan. 8, 2020, which claims priority to German Application No. DE 102019200130.0, filed on Jan. 8, 2019, both of which are hereby incorporated by reference in their entireties.

1. TECHNICAL FIELD

The present invention relates to an improved method and apparatus for treating an article produced at least partly by an additive manufacturing process.

2. PRIOR ART

Additive manufacturing offers numerous advantages over conventional manufacturing techniques. For example, additive manufacturing allows shapes to be produced that could not be obtained with conventional methods. Moreover, additive manufacturing allows a level of customisation that would be unachievable with conventional manufacturing methods.

However, many articles produced by an additive manufacturing technique are not sufficiently strong immediately after additive manufacturing has been completed and require further process steps such as curing in order to harden and consolidate the article for its intended use.

Prior to curing, the article may be quite soft and thus its shape may still be changed during the curing process, either deliberately or undeliberately. The article therefore needs to be supported during the curing process by a supporting structure such as a form or a jig.

Frequently, an article may be produced in different sizes. For example, a midsole for a shoe may be produced for different shoe sizes. Presently, it is necessary to have one particular supporting structure for each size of article. This increases the inventory required at a production facility as well as the complexity of the curing method.

Prior art is mentioned in DE 10 2016 124 387 A1, GB 1 425 312 A and US 2014/0 109 440 A1.

It is therefore an object underlying the present invention to provide a form that may be used for treating different sizes of an article produced at least partly by an additive manufacturing process.

It is a further object of the present invention to provide a method to improve treatment methods for an article produced at least partly by additive manufacturing process.

3. SUMMARY OF THE INVENTION

These objects are accomplished by a method and form according to the independent claims. In particular, the invention concerns a method for treating an article produced at least partly by an additive manufacturing process, comprising: (a) providing a form, comprising a contacting portion configured to contact the article, wherein the contacting portion comprises at least a first surface and a second surface; (b) adjusting a length of the contacting portion and/or adjusting a height of the first surface relative to the second surface; (c) arranging the article on the form such as to contact the contacting portion; and (d) curing the article.

The method according to the present invention therefore allows a single form to be used for a number of different sizes of an article produced at least partly by additive manufacturing process. Therefore, it is not necessary to provide one form for each size, thus reducing the inventory required and improving the efficiency of the treatment method.

The term "additive manufacturing" is taken to have its conventional meaning. That is, additive manufacturing is any technique which applies an additive shaping principle and thereby builds physical 3D geometries by successive addition of material. Additive manufacturing comprises 3D printing and techniques sometimes known as rapid prototyping. In particular, additive manufacturing comprises techniques such as laser sintering, direct metal laser sintering, selective laser melting, fused deposition modelling (FDM®), fused filament fabrication, and stereolithography.

A "contacting portion" of the form is configured to contact the article. However, it is to be understood that the article does not require contiguous contact with the form throughout the contacting portion. In particular, a length of the contacting portion may change without changing a length of the form.

A "height" may be determined with respect to the direction of gravity. However, it is also possible that a height is a distance between the first surface and the second surface more generally. In this case, the article may, for example, be held in place by a clamping mechanism. If the first surface and the second surface are not parallel to each other, an average height is to be taken as a height in the sense of the present invention.

Curing the article may comprise heating the article. Heating the article is a simple and effective method of curing it. Heating may be performed in an oven.

The form may comprise a non-stick coating. A non-stick coating prevents the article from sticking to the form and thus prevents damage to the article when the method is performed. A non-stick coating may, for example, comprise polytetrafluoroethylene (PTFE) also known as Teflon®.

The article may have been produced at least partly by a stereolithography process. Stereolithography allows a level of resolution that cannot be achieved with other additive manufacturing methods. However, articles produced by stereolithography may be particularly soft and fragile directly after the stereolithographic production has been completed. Therefore, these benefit particularly from the method according to the present invention.

The article may comprise a sole element for an article of footwear. A sole element is critical for the wearing comfort of an article of footwear. An article of footwear may be a shoe, such as a running shoe, a football boot, a hiking shoe, a hiking boot, a golf shoe, tennis shoe etc. The cushioning properties afforded by a sole element are particularly important for athletic applications. Additive manufacturing methods allow novel dormitories and shapes of sole elements that could not be achieved using conventional methods. However, a sole element is also subject to significant wear and tear and therefore needs to be cured and hardened such that it is suitable for its intended use. Moreover, a sole element needs to be produced in different sizes. Therefore, the present method is particularly advantageous for an article comprising a sole element. The sole element may, for example, comprise a midsole element, which is crucial for the cushioning properties provided by the article of footwear.

The method may comprise adjusting a length of the contacting portion, the first surface and the second surface may be moveable with respect to each other and adjusting the length of the contacting portion may comprise moving the first surface relative to the second surface. In this case, a length of the form may remain unchanged. Therefore, the total space required by the form is unchanged thus allowing a space-efficient storage.

The method may further comprise adjusting a first angle between the first surface and the second surface. The height of the first surface relative to the second surface may thus also be adjusted. For some articles, different sizes of the article require a different first angle. Therefore, this method allows optimal support in these cases.

The method may further comprise arranging the first surface to contact a heel portion of the sole element and arranging the second surface to contact a midfoot portion of the sole element. Therefore, the method allows the angle between heel portion and midfoot portion of the sole element to be adjusted. The inventors have found that for optimal wearing comfort, this angle should be changed for different sizes of the sole element. An angle between a toe portion and a midfoot portion of the sole element may be identical for different sizes of the sole element.

The contacting portion may further comprise a third surface, wherein the third surface is at a third angle with the second surface, wherein the method further comprises adjusting the third angle. Therefore, the method allows a more specific adaptation for different sizes of the article. For example, the third surface may be configured to contact a toe portion of a sole element. Thus, if an angle between a toe portion and a midfoot portion of the sole element is not identical for different sizes of the sole element, the method may be adapted for this.

The form may comprise at least a first replaceable element, comprising a first height. The inventors have found, that this allows for a simple and fast way of adjusting a length of the contacting portion and/or adjusting a height of the first surface relative to the second surface. The form may comprise any number of replaceable elements, such as, for example, one, two, three, four, five, etc.

The form may comprise an area density of replaceable elements of at least 1 replaceable element per square centimeter. In other embodiments, the form may comprise an area density of replaceable elements of at least 2, 3, 4, 5, 6, 7, 8, 9, 10, 11, 12, 13, 14, 15, 16, 17, 18, 19 or 20 replaceable elements per square centimeter. Thus, a high resolution in adapting the form for different sizes of the article may be achieved.

Adjusting the length of the contacting portion and/or adjusting the height of the first surface relative to the second surface may comprise replacing the first replaceable element with a second replaceable element, wherein the second replaceable element comprises a second height which is different to the first height of the first replaceable element. This allows for a particularly simple and versatile adjustment of the length of the contacting portion and/or the height of the first surface relative to the second surface.

The first replaceable element may be arranged at a first position on the form and adjusting the length of the contacting portion and/or adjusting the height of the first surface relative to the second surface may comprise moving the first replaceable element from the first position to a second position on the form. This allows for a particularly simple and versatile adjustment of the length of the contacting portion and/or the height of the first surface relative to the second surface. This may be performed alternatively or additionally to replacing the first replaceable element with the second replaceable element.

The first replaceable element may be a first pin and/or the second replaceable element may be a second pin and the form may comprise at least one recess configured to retain the first pin or the second pin. This way, the first and/or second replaceable element may be replaced easily and repeatedly many times.

The form may comprise at least one vertically-displaceable element at a vertical position and adjusting the length of the contacting portion and/or adjusting the height of the first surface relative to the second surface may comprise adjusting the vertical position of the vertically-displaceable element. This allows for a particularly fast and simple adjustment of the length of the contacting portion and/or the height of the first surface relative to the second surface.

The form may comprise any number of vertically-displaceable elements, such as, for example, one, two, three, four, five, etc.

The form may comprise an area density of vertically-displaceable elements of at least 1 replaceable element per square centimeter. In other embodiments, the form may comprise an area density of replaceable elements of at least 2, 3, 4, 5, 6, 7, 8, 9, 10, 11, 12, 13, 14, 15, 16, 17, 18, 19 or 20 replaceable elements per square centimeter. Thus, a high resolution in adapting the form for different sizes of the article may be achieved.

The vertically-displaceable element may be a first pin, the form may comprise at least one recess configured to retain the first pin, and adjusting the vertical position of the vertically-displaceable element may comprise moving the first pin vertically within the recess. This way, the vertically-displaceable element may be vertically displaced easily and repeatedly many times.

The invention further concerns a form for treating an article produced at least partly by an additive manufacturing process comprising: (a) a contacting portion, configured to contact the article, comprising at least a first surface and a second surface, (b) wherein the first surface is arranged at a height relative to the second surface, and (c) wherein a length of the contacting portion is adjustable and/or wherein the height of the first surface relative to the second surface is adjustable.

The terms "additive manufacturing", "contacting portion" and "height" are to be understood as for the corresponding method.

The form according to the present invention may be used for a number of different sizes of an article produced at least partly by an additive manufacturing process. Therefore, it is not necessary to provide one form for each size, thus reducing the inventory required and improving the efficiency of the treatment method.

The form may further comprise a non-stick coating. A non-stick coating prevents the article from sticking to the form and thus prevents damage to the article when the method is performed. A non-stick coating may, for example, comprise polytetrafluoroethylene (PTFE) also known as Teflon®.

The first surface and the second surface may be moveable with respect to each other. In this case, a length of the form may remain unchanged. Therefore, the total space required by the form is unchanged thus allowing a space-efficient storage.

A first angle between the first surface and the second surface is adjustable. The height of the first surface relative to the second surface may thus also be adjusted. For some articles, different sizes of the article require a different first angle. Therefore, the form allows optimal support in these cases.

The form may comprise a hinge connecting the first surface and the second surface for adjusting the first angle. A hinge is understood to be any mechanism that allows a relative rotation of the first surface relative to the second surface.

The contacting portion may further comprise a third surface, wherein the third surface is at a third angle with the second surface and wherein the third angle is adjustable. Therefore, the form allows a more specific adaptation for different sizes of the article. For example, the third surface may be configured to contact a toe portion of a sole element. Thus, if an angle between a toe portion and a midfoot portion of the sole element is not identical for different sizes of the sole element, the forms allows the method to be adapted for this.

The form may further comprise at least a first replaceable element, comprising a first height. The inventors have found, that this allows for a simple and fast way of adjusting a length of the contacting portion and/or adjusting a height of the first surface relative to the second surface. The form may comprise any number of replaceable elements, such as, for example, one, two, three, four, five, etc.

The length of the contacting portion may be adjustable and/or the height of the first surface relative to the second surface may be adjustable by replacing the first replaceable element with a second replaceable element, wherein the second replaceable element comprises a second height which is different to the first height of the first replaceable element. This allows for a particularly simple and versatile adjustment of the length of the contacting portion and/or the height of the first surface relative to the second surface.

The form may comprise an area density of replaceable elements of at least 1 replaceable element per square centimeter. In other embodiments, the form may comprise an area density of replaceable elements of at least 2, 3, 4, 5, 6, 7, 8, 9, 10, 11, 12, 13, 14, 15, 16, 17, 18, 19 or 20 replaceable elements per square centimeter. Thus, a high resolution in adapting the form for different sizes of the article may be achieved.

The first replaceable element may be arranged at a first position on the form and the length of the contacting portion and/or the height of the first surface relative to the second surface may be adjustable by moving the first replaceable element from the first position to a second position on the form. This allows for a particularly simple and versatile adjustment of the length of the contacting portion and/or the height of the first surface relative to the second surface. This may be possible alternatively or additionally to replacing the first replaceable element with the second replaceable element.

The first replaceable element may be a first pin and/or the second replaceable element may be a second pin. The form may comprise at least one recess configured to retain the first pin or the second pin. The form may comprise at least a first and a second recess configured to retain the first pin or the second pin. The first recess may define the first position, while the second recess may define the second position. This way, the first and/or second replaceable element may be replaced easily and repeatedly many times.

The form may further comprise at least one vertically-displaceable element at a vertical position for adjusting the length of the contacting portion and/or adjusting the height of the first surface relative to the second surface. This allows for a particularly fast and simple adjustment of the length of the contacting portion and/or the height of the first surface relative to the second surface.

The vertically-displaceable element may be a first pin, the form may further comprise at least one recess configured to retain the first pin but allowing the first pin to be moved vertically within the recess. This way, the vertically-displaceable element may be vertically displaced easily and repeatedly many times.

The form may further comprise a clamping mechanism to fix the first pin at a desired vertical position within the recess. This helps to prevent an unintended vertical displacement of the first/second pin when weight is placed on it.

4. SHORT DESCRIPTION OF THE FIGURES

Figure 1B:
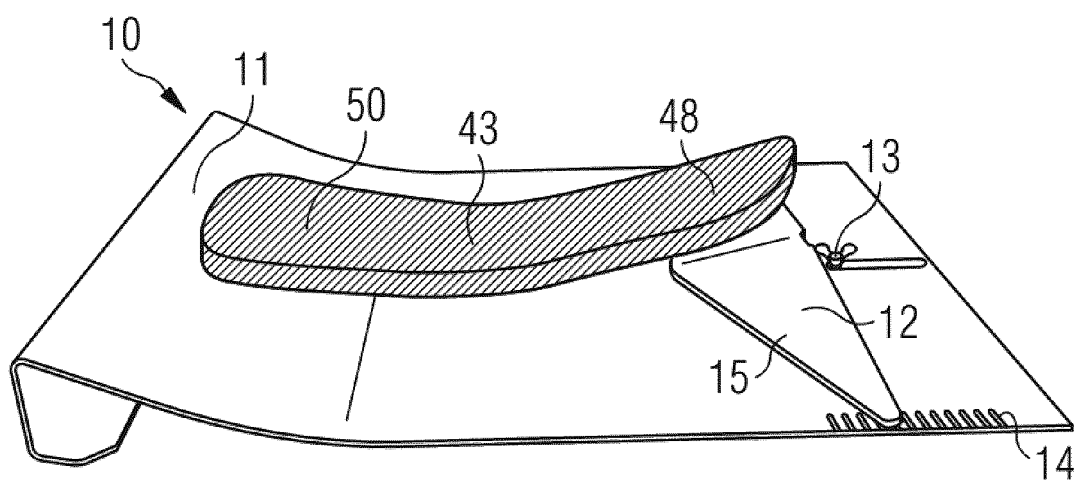
Figure 2:
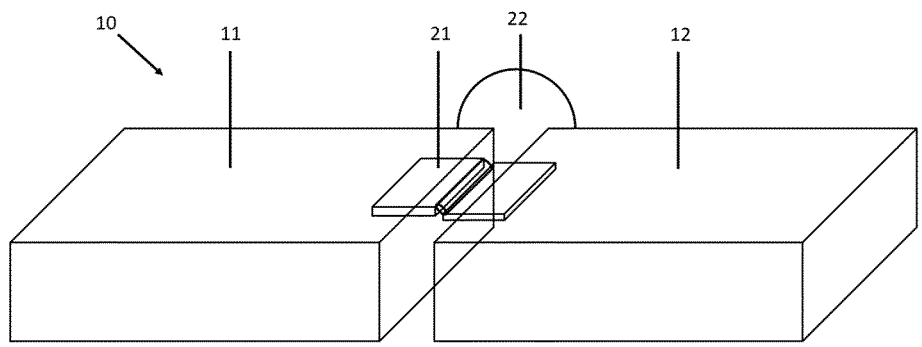
Figure 3A:
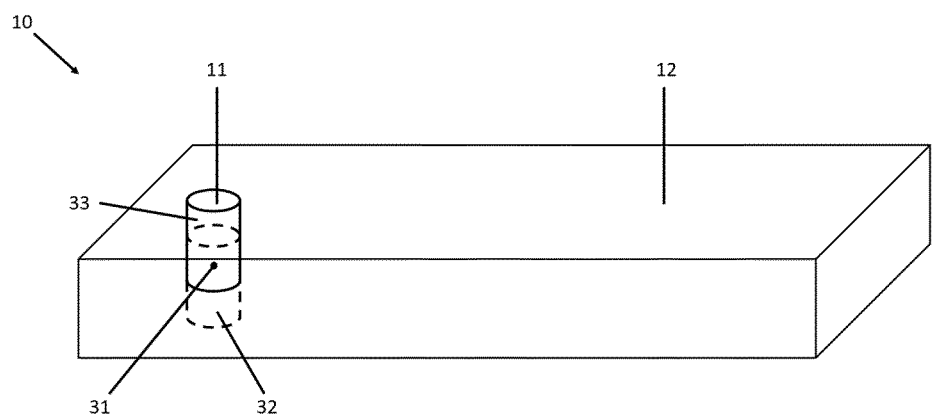
Figure 3B:
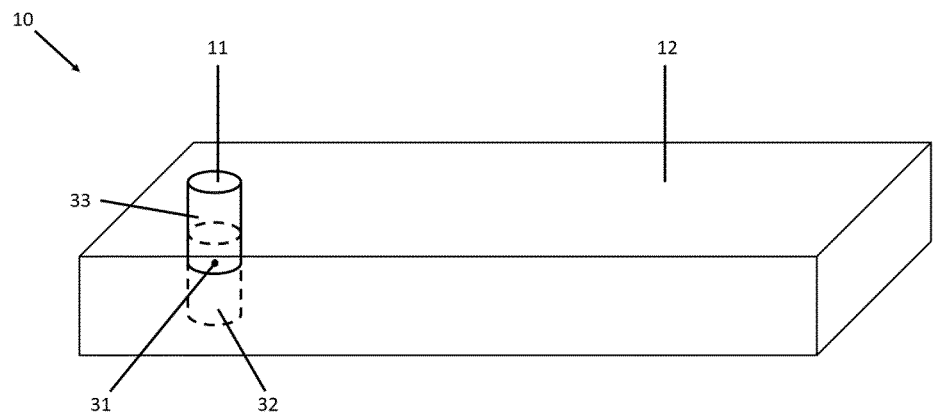
Figure 3C:
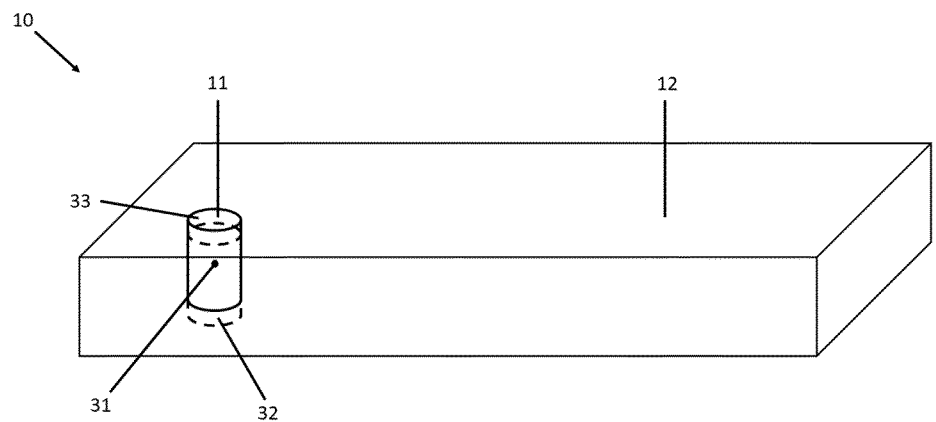
Figure 4A:
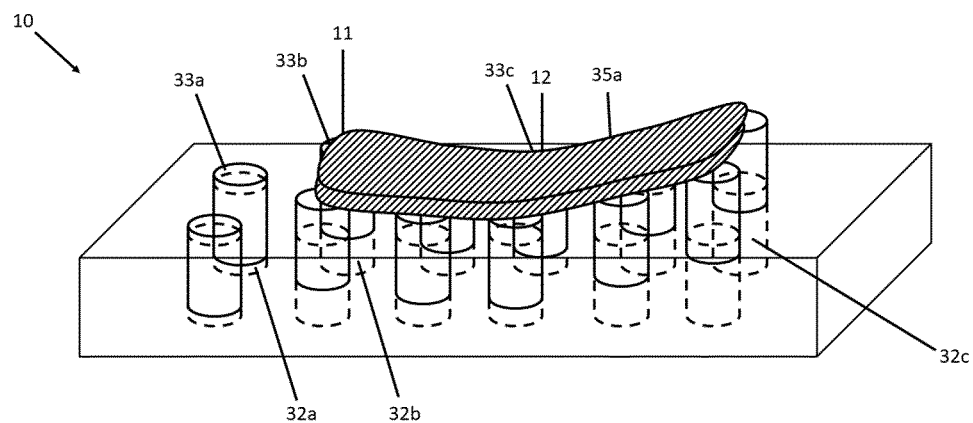
Figure 4B:
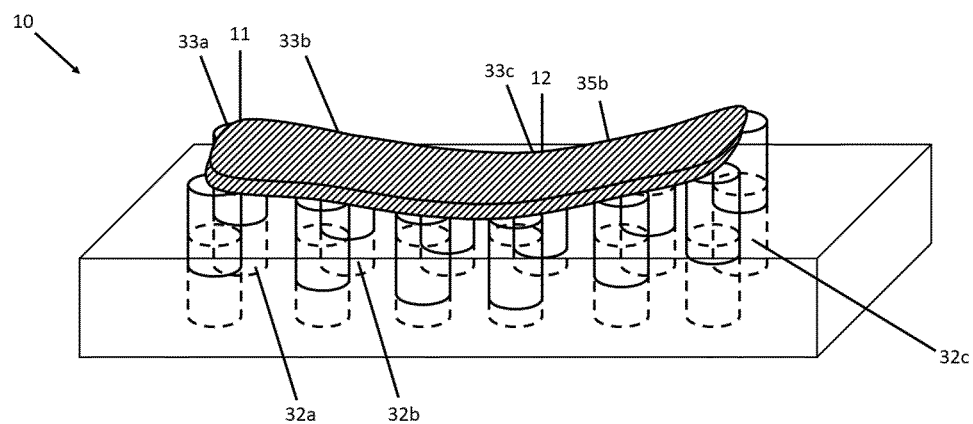
Figure 4C:
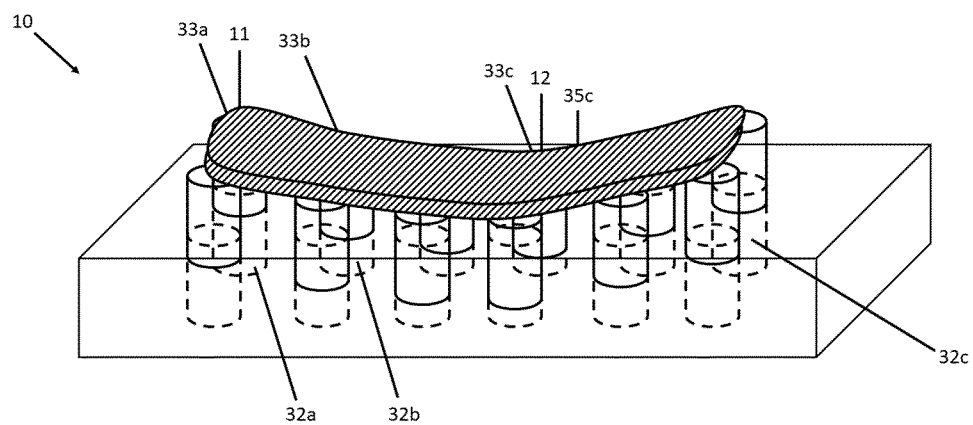
Figure 5A:
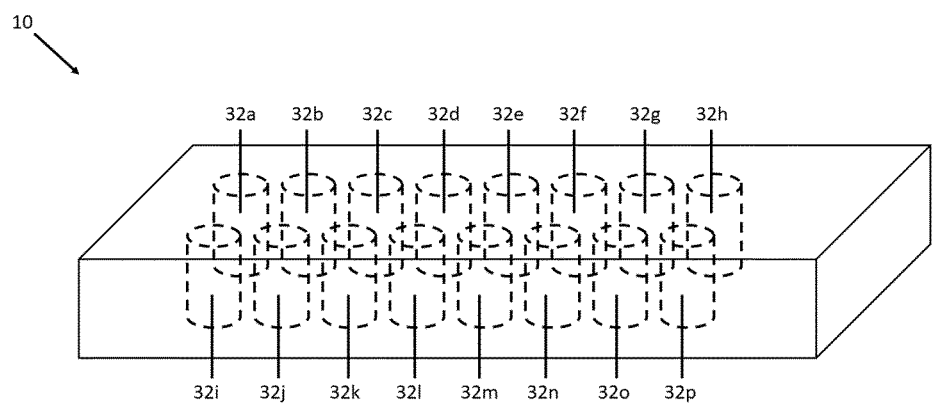
Figure 5B:
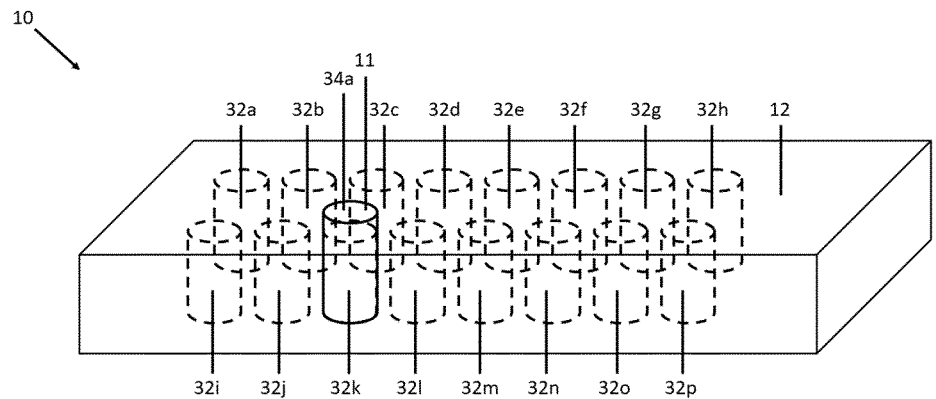
Figure 5C:
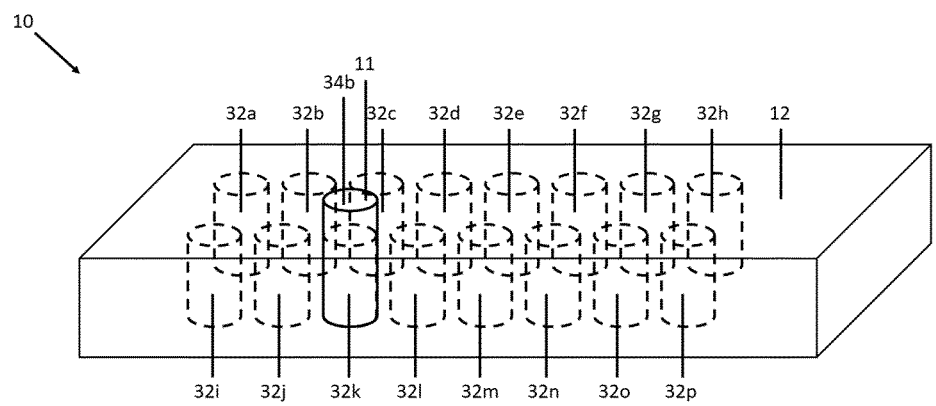
Figure 6A:
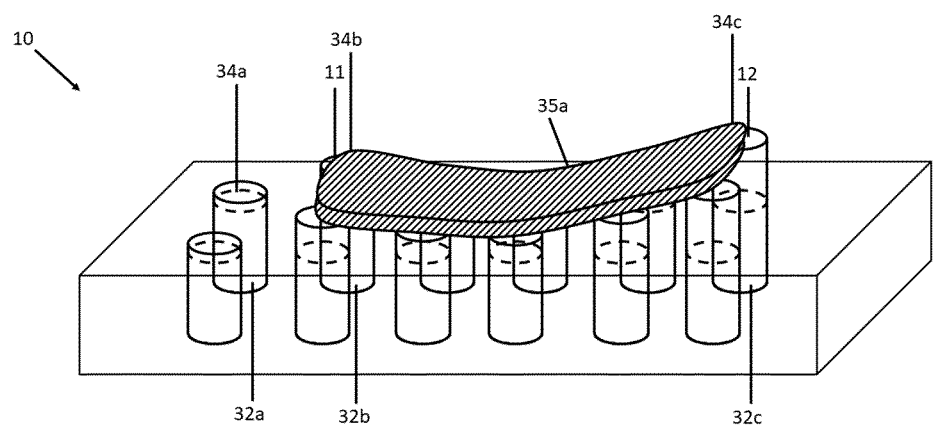
Figure 6B:
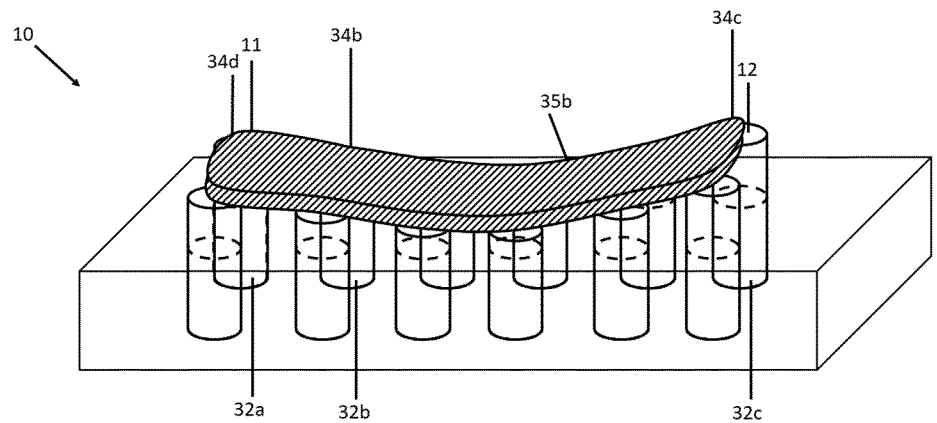
Figure 6C:
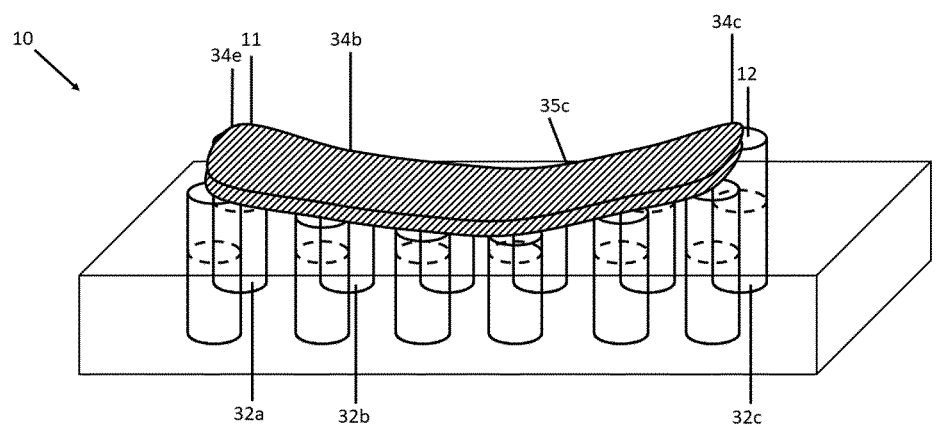
Figure 7A:
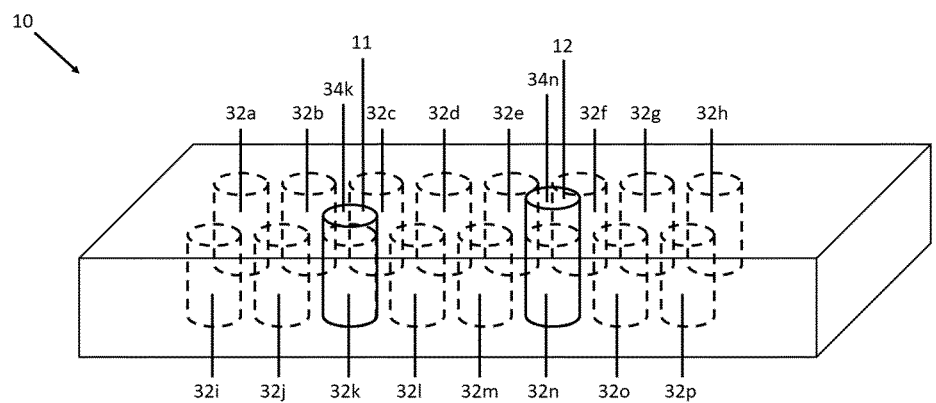
Figure 7B:
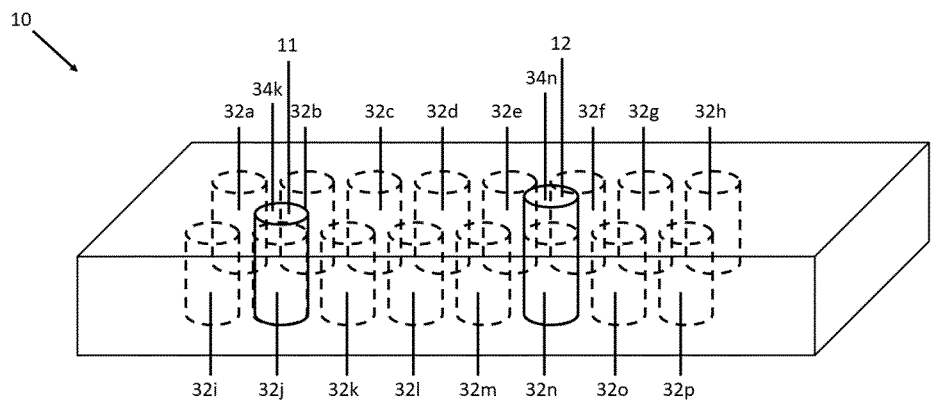
Figure 8A:
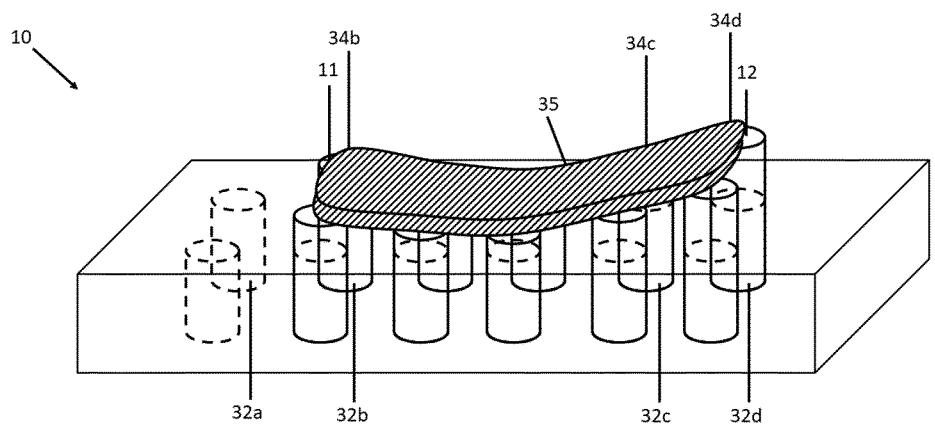
Figure 8B:
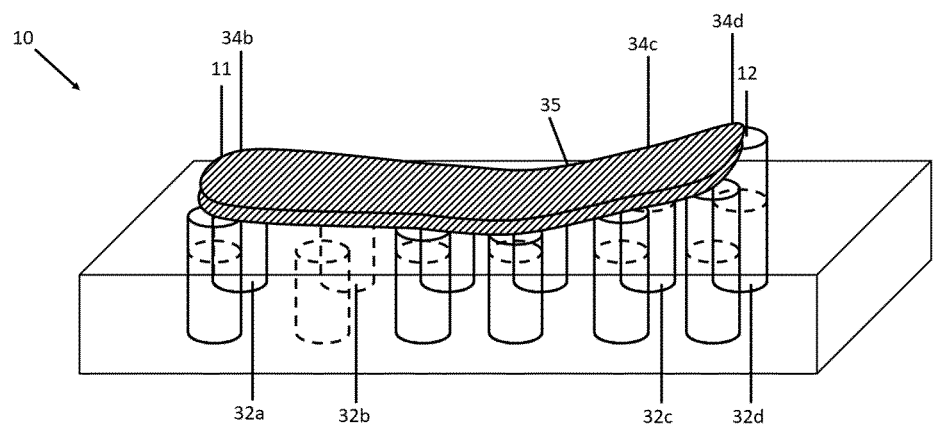
Figure 8C:
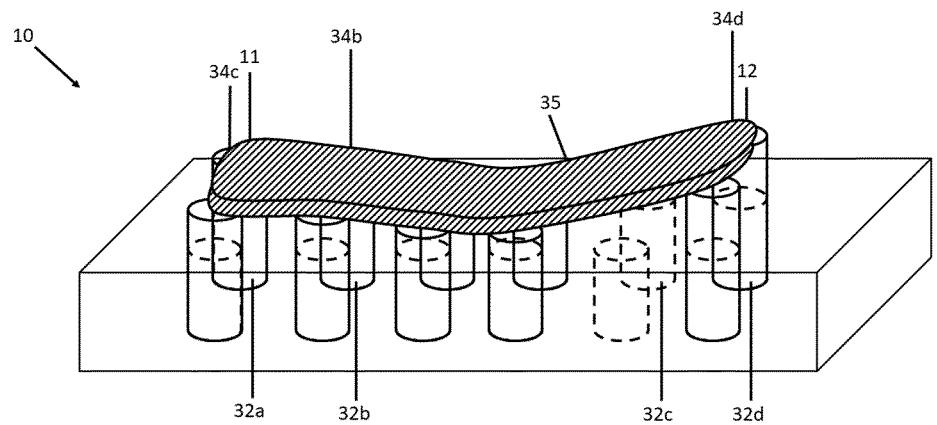
Figure 9:
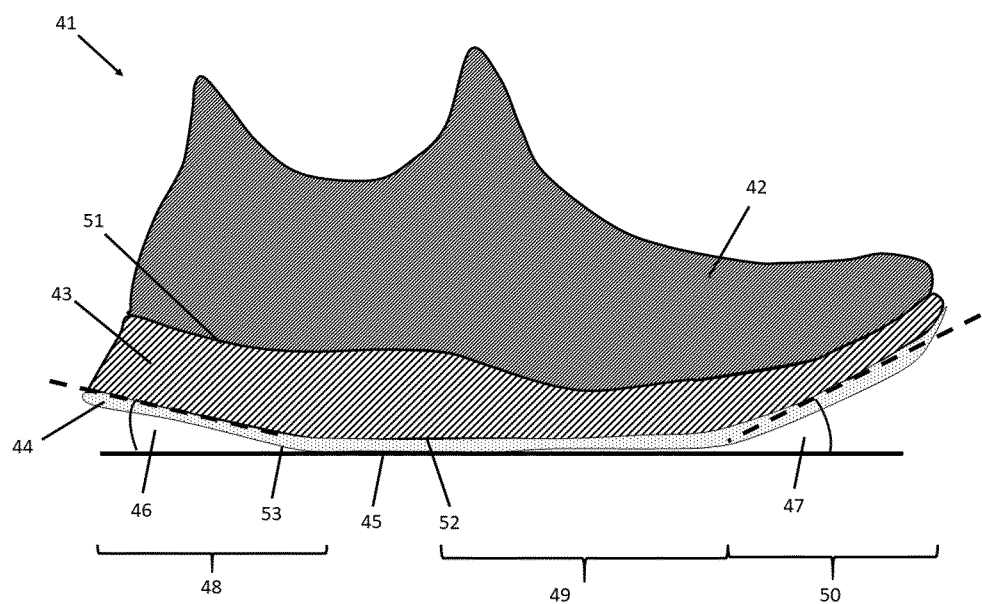

The present invention will be described in more detail with reference to the accompanying figures in the following. These figures show:

FIGS. 1A-B: an exemplary form according to the present invention;

FIG. 2: another exemplary form according to the present invention;

FIGS. 3A-C: another exemplary form according to the present invention, comprising a vertically-displaceable element;

FIGS. 4A-C: another exemplary form according to the present invention, comprising a vertically-displaceable element;

FIGS. 5A-C: another exemplary form according to the present invention, comprising a first replaceable element;

FIGS. 6A-C: another exemplary form according to the present invention, comprising a first replaceable element;

FIGS. 7A-B: another exemplary form according to the present invention, comprising a first replaceable element;

FIGS. 8A-C: another exemplary form according to the present invention, comprising a first replaceable element; and FIG. 9: an exemplary article of footwear.

5. DETAILED DESCRIPTION OF PREFERRED EMBODIMENTS

In the following, only some embodiments of the invention are described in detail. It is to be understood that these exemplary embodiments can be modified in a number of ways and combined with each other whenever compatible and that certain features may be omitted in so far as they appear dispensable.

FIGS. 1A-B show an exemplary form 10 according to the present invention. FIG. 1A shows only the form 10, while FIG. 1B schematically shows an article arranged on the form 10. The exemplary form 10 is for treating an article produced at least partly by an additive manufacturing process and comprises: (a) a contacting portion, configured to contact the article, comprising at least a first surface 11 and a second surface 12, (b) wherein the first surface 11 is arranged at a height relative to the second surface 12, and (c) wherein a length of the contacting portion is adjustable. In this example, a height of the first surface 11 relative to the second surface 12 is not adjustable.

The second surface 12 is arranged on a moveable portion 15, which can be moved relative to the first surface of the form 10.

In this example, the article is a midsole element 43 for an article of footwear and comprises a curved lower surface (not shown) in a toe portion 50. The first surface 11 of the form 10 is curved, in order to optimally support the curved surface of the midsole element 43. The first surface 11 is configured to define a toe spring of the midsole element 43 similar as for the article of footwear illustrated in FIG. 9. The second surface 12 is configured to define a heel lift of the midsole element 43 similar as for the article of footwear illustrated in FIG. 9. Although in the example shown in FIG. 1B only a single midsole is shown for illustration purposes, two or more midsoles may be arranged on the form 10.

The first surface 11 and the second surface 12 are moveable with respect to each other. In this case, a length of the form 10 may remain unchanged. A lateral distance between the first surface 11 and the second surface 12 may be fixed by means of a length adjustment mechanism 13, which in this case comprises a screw. A gauge 14 is used for setting a particular length of the contacting portion.

The form 10 comprises a non-stick coating comprising PTFE.

FIG. 2 shows another exemplary form 10 according to the present invention. The exemplary form 10 is for treating an article produced at least partly by an additive manufacturing process comprising: (a) a contacting portion, configured to contact the article, comprising at least a first surface 11 and a second surface 12, (b) wherein the first surface 11 is arranged at a height relative to the second surface 12, and (c) wherein the height of the first surface 11 relative to the second surface 12 is adjustable.

A first angle 22 between the first surface 11 and the second surface 12 is adjustable. The height of the first surface 11 relative to the second surface 12 may thus also be adjusted. The form 10 comprises a hinge 21 connecting the first surface 11 and the second surface 12 for adjusting the first angle 22. The first angle 22 may be fixed at a certain value by means of a screw that fixes the orientation of the hinge 21. In other embodiments, the contacting portion may further comprise a third surface, wherein the third surface is at a third angle with the second surface 12 and wherein the third angle is adjustable.

FIGS. 3A-C show another exemplary form 10 according to the present invention, comprising a vertically-displaceable element 33. The exemplary form 10 is for treating an article produced at least partly by an additive manufacturing process comprising: (a) a contacting portion, configured to contact the article, comprising at least a first surface 11 and a second surface 12, (b) wherein the first surface 11 is arranged at a height relative to the second surface 12, and (c) wherein the height of the first surface 11 relative to the second surface 12 is adjustable.

The form 10 further comprises a vertically-displaceable element 33 at a vertical position for adjusting the height of the first surface 11 relative to the second surface 12. The vertical position is different in each of the FIGS. 3A-C. The vertically-displaceable element 33 is a first pin, the form 10 further comprises a first recess 32 configured to retain the first pin but allowing the first pin to be moved vertically within the first recess 32. Though the first pin in this example has a substantially circular cross-section, any cross-sectional shape, regular or irregular, may be feasible for any pin.

The form 10 further comprises a clamping mechanism 31 to fix the first pin at a desired vertical position within the first recess 32. In this example, the clamping mechanism comprises a thread into which a screw is inserted. The screw is tightened against the first pin in order to fix it at a desired vertical position.

FIG. 3A shows the first pin at a first vertical position. In FIG. 3B, the first pin is at a second vertical position, which is higher than the first vertical position shown in FIG. 3A. In FIG. 3C, the first pin is at a third vertical position, which is lower than the first vertical position shown in FIG. 3A.

FIGS. 4A-C show another exemplary form 10 according to the present invention, comprising a plurality of vertically-displaceable elements. The form 10 is for treating an article produced at least partly by an additive manufacturing process and comprises: (a) a contacting portion, configured to contact the article, comprising at least a first surface 11 and a second surface 12, (b) wherein the first surface 11 is arranged at a height relative to the second surface 12, and (c) wherein a length of the contacting portion is adjustable and the height of the first surface 11 relative to the second surface 12 is adjustable.

The form 10 comprises a number of vertically-displaceable elements, each at a respective vertical position. The form 10 comprises an area density of vertically-displaceable elements of one vertically-displaceable element per square centimetre.

Some exemplary vertically-displaceable elements are labelled 33a-c. Each vertically-displaceable element 33a-c is a pin and the form 10 further comprises a corresponding recess for each pin, which allows each pin to be moved vertically within its corresponding recess.

The first configuration of the form 10 as shown in FIG. 4A supports a first article produced by additive manufacturing. This example, the first article is a midsole 35a for an article of footwear. The midsole 35a is in contact in particular with pins 33b and 33c, which form 10 the first surface 11 and the second surface 12, respectively. In particular, the midsole is not in contact with pin 33a, which is arranged in recess 32a.

The second configuration of the form 10 as shown in FIG. 4B supports a larger-size midsole 35b for an article of footwear. Pin 33a has been raised relative to the vertical position shown in FIG. 4A.

The midsole 35b remains in contact in particular with pins 33b and 33c, which form the first surface 11 and the second surface 12, respectively. Compared to the first configuration shown in FIG. 4A, pin 33a has been raised vertically. Thus, the midsole 35b is now in contact with pin 33a, which is arranged in recess 32a. The first surface 11 of the form 10 is now formed by pin 33a. Therefore, the length of the contacting portion in the second configuration is increased compared to the first configuration. Pin 33a in the second configuration is also at a higher vertical position than pin 33b in the first or second configuration. Therefore, the height of the first surface 11 relative to the second surface 12 is increased in the second configuration compared to the first configuration.

A third configuration of the form 10 is shown in FIG. 4C. Compared to the second configuration shown in FIG. 4B, pin 33a has been raised further vertically. Therefore, the height of the first surface 11 relative to the second surface 12 is increased and the third configuration compared to the second configuration. In this example, the first surface 11 is arranged to contact a heel portion of the midsole and the second surface 12 is arranged to contact a midfoot portion of the sole element 35c. Therefore, the angle between heel portion and midfoot portion, which is also referred to as heel lift, of the midsole can be adjusted.

FIGS. 5B-C show another exemplary form 10 according to the present invention, comprising a first replaceable element. The form 10 is for treating an article produced at least partly by an additive manufacturing process and comprises: (a) a contacting portion, configured to contact the article, comprising at least a first surface 11 and a second surface 12, (b) wherein the first surface 11 is arranged at a height relative to the second surface 12, and (c) wherein the height of the first surface 11 relative to the second surface 12 is adjustable.

FIG. 5A shows a form 10 comprising a plurality of recesses 32a-32p for retaining a pin. FIG. 5B shows a form 10 further comprising a pin 34a comprising a first height. Pin 34a is fully inserted into recess 32k. The upper surface of the pin 34a comprises the first surface 11. The pin 34a is replaceable and has been replaced in FIG. 5C by pin 34b, which comprises a second height that is greater than the first height. The upper surface of the pin 34b now comprises the first surface 11. Therefore, wherein the height of the first surface 11 relative to the second surface 12 has been increased in FIG. 5C compared to FIG. 5B.

FIGS. 6A-C show another exemplary form 10 according to the present invention, comprising a plurality of replaceable elements. FIGS. 6A-C are analogous to FIGS. 4A-C, except that the latter relate to a vertically-displaceable element. In the examples shown in FIGS. 6A-C, pin 34a shown in FIG. 6A is replaceable and is replaced by a higher pin, i.e. comprising a greater height, 34d in FIG. 6B and by an even higher pin 34e in FIG. 6C, instead of adjusting the vertical position of pin vertically-displaceable pin 33a as shown in FIGS. 4A-C. As for the example shown in FIGS. 4A-C, the exemplary form 10 shown in FIGS. 6A-C allows a length of the contacting portion of the form 10 and the height of the first surface 11 relative to the second surface 12 to be adjusted.

FIGS. 7A-B show another exemplary form 10 according to the present invention, comprising a first replaceable element. FIGS. 7A-B are analogous to FIGS. 5A-B, except that in the latter case, the pin 34a shown in FIG. 5B has been replaced in FIG. 5C by pin 34b, which comprises a second height that is greater than the first height of pin 34a. In the example shown in FIGS. 7A-B, replaceable pin 34k is fully inserted into recess 32k in FIG. 7A. In FIG. 7B, replaceable pin 34k has been moved to recess 32j. Therefore, a length of the contacting portion of the form 10 is increased in FIG. 7B compared to FIG. 7A.

FIGS. 8A-C show another exemplary form 10 according to the present invention, comprising a first replaceable element. FIGS. 8A-C are analogous to FIGS. 6A-C, except that the latter case pin 34a shown in FIG. 6A is replaced by a higher pin 34d in FIG. 6B and by an even higher pin 34e in FIG. 6C. In FIG. 8A, pin 34b is fully inserted into recess 32b.

In FIG. 8B, pin 34b has been moved to recess 32a. Therefore, the length of the contacting portion of the form 10 is increased in FIG. 8B compared to FIG. 8A.

In FIG. 8C, pin 34c has been moved to recess 32a from recess 32c as shown in FIG. 8A. Therefore, the length of the contacting portion of the form 10 is increased in FIG. 8C compared to FIG. 8A. Moreover, pin 34c now comprises the first surface 11. Therefore, the height of the first surface 11 relative to the second surface 12 has been increased in FIG. 8C compared to FIG. 8A.

FIG. 9 shows an exemplary article of footwear 41. The exemplary article of footwear 41 is a running shoe 41. The running shoe 41 comprises an upper 42, a midsole 43, produced by stereolithography, and an outsole 44, which is attached to the midsole. The midsole 43 comprises an upper surface 51 and a lower surface 52, wherein the upper surface 51 is configured to be arranged proximate the upper 42, in this case the upper surface 51 of the midsole 43 is attached to the upper 42. The lower surface 52 is configured to be arranged proximate the outsole 44, in this case the lower surface 52 of the midsole 43 is attached to the outsole 44. An angle 46 formed between the heel portion 48 and the midfoot portion 49 is called heel lift. An angle 47 formed between the toe portion 50 and the midfoot portion 49 is called toe spring. In this example, the heel portion 48 and the toe portion 50 of the midsole 43 comprise a flat lower surface 52 such that the heel lift 46 and/or the toe spring 47 are characterized by only one angle each. However, it is also possible, that the heel portion 48 and/or the toe portion 50 of the midsole 43 are curved.

Note that the terms heel lift and toe spring generally relate to the angles as described above formed by a lower surface 52 of the midsole 43, rather than a lower surface 53 of the outsole 44. In this example, the outsole 44 comprises a substantially even thickness over its entire length, such that an angle formed by the outsole 44 with the ground 45 in a heel portion 48 essentially corresponds to the heel lift 46 and an angle formed by the outsole 44 with the ground 45 in a toe portion 50 essentially corresponds to the toe spring 47.

The midsole 43 was arranged on a form as described herein, placed in an oven, heated and thus cured, and then attached to the outsole 44.

REFERENCE SIGNS

10: form
11: first surface
12: second surface
13: length adjustment mechanism
14: size gauge
15: moveable portion
21: hinge
22: first angle
31: clamping mechanism
32: recess
33: vertically-displaceable element
34: replaceable element
41: article of footwear
42: shoe upper
43: midsole
44: outsole
45: ground
46: heel lift
47: toe spring
48: heel portion
49: midfoot portion
50: toe portion
51: upper surface of midsole
52: lower surface of midsole
53: lower surface of outsole In the following, further embodiments are described to facilitate understanding the invention:

1. A method for treating an article (43) produced at least partly by an additive manufacturing process, comprising:
   (a) providing a form, comprising a contacting portion configured to contact the article (43), wherein the contacting portion comprises at least a first surface (11) and a second surface (12);
   (b) adjusting a length of the contacting portion and/or adjusting a height of the first surface (11) relative to the second surface (12);
   (c) arranging the article (43) on the form (10) such as to contact the contacting portion; and
   (d) curing the article (43).

2. The method according to the preceding embodiment, wherein curing the article (43) comprises heating the article (43).

3. The method according to one of the preceding embodiments, wherein the form (10) comprises a non-stick coating.

4. The method according to one of the preceding embodiments, wherein the article (43) was produced at least partly by a stereolithography process.
5. The method according to one of the preceding embodiments, wherein the article (43) comprises a sole element (43) for an article of footwear (41).
6. The method according to one of the preceding embodiments, wherein the method comprises adjusting a length of the contacting portion and wherein the first surface (11) and the second surface (12) are moveable with respect to each other and wherein adjusting the length of the contacting portion comprises moving the first surface (11) relative to the second surface (12).
7. The method according to one of the preceding embodiments, further comprising adjusting a first angle (22) between the first surface (11) and the second surface (12).
8. The method according to the preceding embodiment and embodiment 5, further comprising arranging the first surface (11) to contact a heel portion of the sole element and arranging the second surface (12) to contact a midfoot portion of the sole element.
9. The method according to one of the preceding embodiments, wherein the contacting portion further comprises a third surface, wherein the third surface is at a third angle with the second surface (12), wherein the method further comprises adjusting the third angle.
10. The method according to one of the preceding embodiments, wherein the form (10) comprises at least a first replaceable element (34), comprising a first height.
11. The method according to the preceding embodiment, wherein adjusting the length of the contacting portion and/or adjusting the height of the first surface (11) relative to the second surface (12) comprises replacing the first replaceable element (34a) with a second replaceable element (34d, 34e), wherein the second replaceable element (34d, 34e) comprises a second height which is different to the first height of the first replaceable element (34a).
12. The method according to one of embodiments 10 or 11, wherein the first replaceable element (34a) is arranged at a first position on the form (10) and wherein adjusting the length of the contacting portion and/or adjusting the height of the first surface (11) relative to the second surface (12) comprises moving the first replaceable element (34a) from the first position to a second position on the form.
13. The method according to one of embodiments 10-12, wherein the first replaceable element is a first pin and/or the second replaceable element is a second pin and wherein the form (10) comprises at least one recess (32) configured to retain the first pin or the second pin.
14. The method according to one of the preceding embodiments, wherein the form (10) comprises at least one vertically-displaceable element (33) at a vertical position, and wherein adjusting the length of the contacting portion and/or adjusting the height of the first surface (11) relative to the second surface (12) comprises adjusting the vertical position of the vertically-displaceable element (33).
15. The method according to the preceding embodiment, wherein the vertically-displaceable element (33) is a first pin, wherein the form (10) comprises at least one recess (32) configured to retain the first pin, and wherein adjusting the vertical position of the vertically-displaceable element (33) comprises moving the first pin vertically within the recess (32).
16. A form (10) for treating an article (43) produced at least partly by an additive manufacturing process comprising:
    (a) a contacting portion, configured to contact the article (43), comprising at least a first surface (11) and a second surface (12),
    (b) wherein the first surface (11) is arranged at a height relative to the second surface (12), and
    (c) wherein a length of the contacting portion is adjustable and/or wherein the height of the first surface (11) relative to the second surface (12) is adjustable.
17. The form (10) according to the preceding embodiment, further comprising a nonstick coating.
18. The form (10) according to one of embodiments 16 or 17, wherein the first surface (11) and the second surface (12) are moveable with respect to each other.
19. The form (10) according to one of embodiments 16-18, wherein a first angle (22) between the first surface (11) and the second surface (12) is adjustable.
20. The form (10) according to the preceding embodiment, comprising a hinge (21) connecting the first surface (11) and the second surface (12) for adjusting the first angle (22).
21. The form (10) according to one of embodiments 16-20, wherein the contacting portion further comprises a third surface, wherein the third surface is at a third angle with the second surface (12) and wherein the third angle is adjustable.
22. The form (10) according to one of embodiments 16-21, further comprising at least a first replaceable element (34), comprising a first height.
23. The form (10) according to the preceding embodiment, wherein the length of the contacting portion is adjustable and/or wherein the height of the first surface (11) relative to the second surface (12) is adjustable by replacing a first replaceable element (34a) with a second replaceable element (34d, 34e), wherein the second replaceable element (34d, 34e) comprises a second height which is different to the first height of the first replaceable element (34a).
24. The form (10) according to one of embodiments 22 or 23, wherein the first replaceable element (34a) is arranged at a first position on the form (10) and wherein the length of the contacting portion and/or the height of the first surface (11) relative to the second surface (12) is adjustable by moving the first replaceable element (34a) from the first position to a second position on the form.
25. The form (10) according to one of embodiments 22-24, wherein the first replaceable element (34a) is a first pin and/or the second replaceable element (34d, 34e) is a second pin and wherein the form (10) comprises at least one recess (32) configured to retain the first pin or the second pin.
26. The form (10) according to one of embodiments 16-25, further comprising at least one vertically-displaceable element (33) at a vertical position for adjusting the length of the contacting portion and/or adjusting the height of the first surface (11) relative to the second surface (12).
27. The form (10) according to the preceding embodiment, wherein the vertically-displaceable element (33) is a first pin, wherein the form (10) further comprises at least a first recess (32) configured to retain the first pin but allowing the first pin to be moved vertically within the first recess (32).
28. The form (10) according to the preceding embodiment, further comprising a clamping mechanism to fix the first pin at a desired vertical position within the first recess (32).

The invention claimed is:

1. A method for treating an article produced at least partly by an additive manufacturing process, comprising:
   (a) providing a form, comprising a contacting portion configured to contact the article, wherein the contacting portion comprises at least a first surface and a second surface, wherein the form comprises a first recess and a first replaceable element received within the first recess so as to extend out from the first recess to a first height;
   (b) adjusting at least one of a length of the contacting portion or a height of the first surface relative to the second surface by removing the first replaceable element from the first recess, replacing the first replaceable element with a second replaceable element, and placing the second replaceable element within the first recess so as to extend out from the first recess to a second height different from the first height;
   (c) arranging the article on the form such as to contact the contacting portion; and
   (d) curing the article.

2. The method according to claim 1, wherein the article comprises a sole element for an article of footwear.

3. The method according to claim 1, wherein the method comprises adjusting a length of the contacting portion, wherein the first surface and the second surface are moveable with respect to each other, and wherein adjusting the length of the contacting portion comprises moving the first surface relative to the second surface.

4. The method according to claim 1, further comprising adjusting a first angle between the first surface and the second surface.

5. The method according to claim 4, further comprising arranging the first surface to contact a heel portion of a sole element and arranging the second surface to contact a midfoot portion of the sole element.

6. The method according to claim 1, wherein the contacting portion further comprises a third surface, wherein the third surface is at a third angle with the second surface, and wherein the method further comprises adjusting the third angle.

7. The method according to claim 1, wherein the first replaceable element is arranged at a first position on the form, and wherein adjusting the at least one of the length of the contacting portion or the height of the first surface relative to the second surface comprises moving the first replaceable element from the first position to a second position on the form.

8. The method according to claim 1, wherein the form comprises a non-stick coating.

9. The method according to claim 1, wherein the article was produced at least partly by a stereolithography process.

10. The method according to claim 1, wherein providing the form further comprises providing with an upper surface of the first replaceable element forming at least a portion of the first surface, and wherein the adjusting further comprises arranging so that an upper surface of the second replaceable element is forming at least a portion of the first surface.

* * * * *